(12) United States Patent
Veldandi et al.

(10) Patent No.: US 10,699,375 B2
(45) Date of Patent: Jun. 30, 2020

(54) METHOD AND APPARATUS FOR IMAGE ADJUSTMENT FOR PANORAMIC IMAGE STITCHING

(71) Applicant: Nokia Technologies Oy, Espoo (FI)

(72) Inventors: Muninder Veldandi, Sunnyvale, CA (US); Prasad Balasubramanian, Sunnyvale, CA (US)

(73) Assignee: Nokia Technologies Oy, Espoo (FI)

( * ) Notice: Subject to any disclaimer, the term of this patent is extended or adjusted under 35 U.S.C. 154(b) by 164 days.

(21) Appl. No.: 15/432,421

(22) Filed: Feb. 14, 2017

(65) Prior Publication Data
US 2018/0232854 A1 Aug. 16, 2018

(51) Int. Cl.
*G06T 11/60* (2006.01)
*G06T 3/40* (2006.01)
*H04N 5/232* (2006.01)
*H04N 13/207* (2018.01)
*H04N 13/00* (2018.01)

(52) U.S. Cl.
CPC ....... *G06T 3/4038* (2013.01); *H04N 5/23206* (2013.01); *H04N 5/23238* (2013.01); *H04N 13/00* (2013.01); *H04N 13/207* (2018.05)

(58) Field of Classification Search
CPC ......... G06T 3/4038; G06T 7/37; G06T 5/002; G06T 2207/20192; G06T 2207/10004; G06T 2207/20221; H04N 5/23238
See application file for complete search history.

(56) References Cited

U.S. PATENT DOCUMENTS

| 8,594,458 | B2 | 11/2013 | Wiesenfarth |
| 9,361,721 | B2 | 6/2016 | Muninder et al. |
| 2011/0157386 | A1* | 6/2011 | Ishii ............ H04N 5/232 348/211.4 |

(Continued)

FOREIGN PATENT DOCUMENTS

CN 103533266 1/2014

OTHER PUBLICATIONS

Bosco, A. et al., *Digital Video Stabilization through Curve Warping Techniques*, [retrieved Feb. 16, 2018]. Retrieved from the Internet: <URL: https://pdfs.semanticscholar.org/fc1c/9af85b4daa885a912b4b8a085b0697bfd4a7.pdf>. 6 pages.

(Continued)

*Primary Examiner* — Howard D Brown, Jr.
(74) *Attorney, Agent, or Firm* — Alston & Bird LLP

(57) ABSTRACT

A method, apparatus and computer program products are provided for reducing artifacts in a seam region when stitching overlapping images. One example method includes extracting the seam region from the overlapping images, wherein the overlapping images comprise a first image captured by a first image capturing device and a second image captured by a second image capturing device, the overlapping images sharing the seam region, the seam region being a region of each of the first image and the second images depicting a common captured area, applying a set of convergence values to the seam region generating a plurality of strips corresponding to the seam region, dividing the plurality of strips into multiple vertical segments, and computing an optimal convergence for each of the multiple vertical segments.

18 Claims, 4 Drawing Sheets

(56) References Cited

U.S. PATENT DOCUMENTS

| | | | | |
|---|---|---|---|---|
| 2012/0221585 | A1* | 8/2012 | Williamson | G06F 16/258 707/756 |
| 2013/0287304 | A1* | 10/2013 | Kimura | G06T 7/33 382/199 |
| 2013/0329002 | A1* | 12/2013 | Tico | G06T 3/4038 348/36 |
| 2015/0172620 | A1* | 6/2015 | Guo | G06T 11/60 348/659 |
| 2016/0295108 | A1 | 10/2016 | Cao | |
| 2018/0082454 | A1* | 3/2018 | Sahu | G06T 7/90 |

OTHER PUBLICATIONS

Cabral, Brian, *Introducing Facebook Surround 360: An open, highquality 3D-360 video capture system* [retrieved Feb. 16, 2018]. Retrieved from the Internet: <URL: https://code.facebook.com/posts/1755691291326688/introducing-facebook-surround-360-an-open-high-quality-3d-360-video-capture-system/>. (Apr. 12, 2016) 11 pages.

Jia, J. et al., *Eliminating Structure and Intensity Misalignment in Image Stitching*, Chinese University of Hong Kong, [Retrieved Feb. 14, 2018]. Retrieved from the Internet: <URL: http://www.cse.cuhk.edu.hk/leojia/all_final_papers/image_stitching_iccv05.pdf>. 8 pages.

Lee, J.T. et al., *Stitching of Heterogeneous Images Using Depth Information*, National Research Foundation of Korea (NRF), [Retrieved Feb. 14, 2018]. Retrieved from the Internet: <URL: http://www.apsipa.org/proceedings_2013/papers/259_Stitching-of-Lee-2928351.pdf>. 4 pages.

Wang, K. et al., *Alignment of Curves by Dynamic Time Warping*, AMS, The Annals of Statistics. Retrieved from the Internet: <URL: http://campar.in.tum.de/twiki/pub/Workflow/SharedFiles/WangGasser_97_Alignmentofcurvesbydynamictimewarping.pdf>. (1997) 1251-1276.

International Search Report and Written Opinion for Application No. PCT/IB2018/050322 dated May 29, 2018, 12 pages.

Yan, T. et al., *Seamless Stitching of Stereo Images for Generating Infinite Panoramas*, Proceedings of the 19$^{th}$ ACM Symposium on Virtual Reality Software and Technology, Oct. 6-9, 2013, [retrieved on Jun. 18, 2019] Retrieved from the Internet: https://www.google.com/search?q=Seamless+Stitching+of+Ster>ao+Images+for+Generating+Infinite+Panoramas&riz=1C1GCEB_enUS853US853&oq> pp. 251-258.

Ozo+Post Production Workflow, Aug. 29, 2017, [retrieved on May 22, 2018] Retrieved from the Internet: https://docs.ozo.nokia.com/learn/OZO_Post_Workflow_Documentation.pdf; pp. 39-44.

\* cited by examiner

METHOD AND APPARATUS FOR IMAGE ADJUSTMENT FOR PANORAMIC IMAGE STITCHING

TECHNOLOGICAL FIELD

Embodiments of the present invention relate generally to a method, apparatus, and computer program product for image adjustment in panoramic image stitching, and in particular, to reducing artifacts in the seam region or region of overlap when stitching multiple images to form a panoramic image.

BACKGROUND

To form a stereo panoramic image, multiple cameras, set up in a particular configuration, may be used to capture 360-degree content. The content may then be stitched to form the stereo panoramic image. Conventional processes for stitching the content are unable to effectively and efficiently handle overlap regions of the captured images and, in particular, when the overlap regions comprise depth variations, conventional processes, such as transform based stitching, will give rise to artifacts.

Specifically, conventional transform based stitching processes give rise to artifacts, such as ghosting or double impressions of objects, when the seam regions comprise of objects located at varying distances from the camera. The current invention provides a solution to minimize such artifacts.

BRIEF SUMMARY

Embodiments described herein, for example, provide solutions for minimizing artifacts in a stitching process, and in particular, may be applied to images or content captured, for example, using an OZO camera. For example, at a narrow seam region of the content captured with an OZO camera, the seam area is relatively smaller in width. For example, the width of the narrow seam region may be approximately 7.5 degrees of the total 360 degrees. In this context, conventional or existing approaches (e.g., optical flow based stitching) may be difficult to apply. Accordingly, embodiments described herein provide a solution to perform a stitching process, for example, in those contexts comprising smaller widths, while minimizing the artifacts.

A method, apparatus and computer program product are therefore provided according to an example embodiment of the present invention for reducing artifacts in the seam region or region of overlap when stitching multiple images to form a panoramic image.

In some embodiments, a method may be provided, the method comprising extracting the seam region from the overlapping images, wherein the overlapping images comprise a first image captured by a first image capturing device and a second image captured by a second image capturing device, applying a set of convergence values to the seam region generating a plurality of strips corresponding to the seam region, dividing each of the plurality of strips into multiple vertical segments, and computing an optimal convergence for the seam region using the multiple vertical segments.

In some embodiments, the overlapping images sharing the seam region, the seam region being a region of each of the first image and the second images depicting a common captured area. In some embodiments, the method may further comprise computing a distance matrix ($d(x, y)$) wherein x is a segment index value and y is an associated convergence value. In some embodiments, the computing of the distance matrix ($d(x, y)$) occurs subsequent to the dividing of each of the plurality of strips into multiple vertical segments. In some embodiments, computing the optimal convergence for each of the multiple vertical segments of the seam region comprises computing an accumulated distance matrix by accumulating each of the distances in the distance matrix, wherein optimal convergence is identified by the accumulated distance matrix having a minimal cumulative error.

In some embodiments, accumulating each of the distances in the distance matrix is performed via a dynamic programming process. In some embodiments, the set of convergence values are varied across the seam region in a horizontal or a vertical direction, and the method further comprises computing a curve denoting a variation of convergence for the narrow seam for a specified number of points.

In some embodiments, the method may further comprise applying a smoothness parameter to guide the convergence amongst the plurality of computed convergence values. In some embodiments, the method may further comprise, in an instance in which an object is captured within a predetermined distance of a camera, enabling convergence transitions between segments exceeding a predefined threshold.

In some embodiments, a computer program product may be provided comprising at least one non-transitory computer-readable storage medium having computer-executable program code instructions stored therein, the computer-executable program code instructions comprising program code instructions for extracting the seam region from the overlapping images, wherein the overlapping images comprise a first image captured by a first image capturing device and a second image captured by a second image capturing device, applying a set of convergence values to the seam region generating a plurality of strips corresponding to the seam region, dividing each of the plurality of strips into multiple vertical segments, and computing an optimal convergence for the seam region using the multiple vertical segments.

In some embodiments, the overlapping images sharing the seam region, the seam region being a region of each of the first image and the second images depicting a common captured area. In some embodiments, the computer-executable program code instructions further comprise program code instructions for computing a distance matrix ($d(x, y)$) wherein x is a segment index value and y is an associated convergence value. In some embodiments, the computing of the distance matrix ($d(x, y)$) occurs subsequent to the dividing of each of the plurality of strips into multiple vertical segments In some embodiments, computing the optimal convergence for each of the multiple vertical segments of the seam region comprises computing an accumulated distance matrix by accumulating each of the distances in the distance matrix, wherein optimal convergence is identified by the accumulated distance matrix having a minimal cumulative error. In some embodiments, accumulating each of the distances in the distance matrix is performed via a dynamic programming process. In some embodiments, the set of convergence values are varied across the seam region in a horizontal or a vertical direction, and wherein the computer-executable program code instructions further comprise program code instructions for computing a curve denoting a variation of convergence for the narrow seam for a specified number of points.

In some embodiments, the computer-executable program code instructions further comprise program code instructions for applying a smoothness parameter to guide the convergence amongst the plurality of computed convergence values. In some embodiments, the computer-executable program code instructions further comprise program code instructions for, in an instance in which an object is captured within a predetermined distance of a camera, enabling convergence transitions between segments exceeding a predefined threshold.

In some embodiments, an apparatus may be provided, the apparatus comprising means for extracting the seam region from the overlapping images, wherein the overlapping images comprise a first image captured by a first image capturing device and a second image captured by a second image capturing device, means for applying a set of convergence values to the seam region generating a plurality of strips corresponding to the seam region, means for dividing each of the plurality of strips into multiple vertical segments, and means for computing an optimal convergence for the seam region using the multiple vertical segments.

In some embodiments, the overlapping images sharing the seam region, the seam region being a region of each of the first image and the second images depicting a common captured area. In some embodiments, the apparatus may further comprise means for computing a distance matrix $(d(x, y))$ wherein x is a segment index value and y is an associated convergence value. In some embodiments, the computing of the distance matrix $(d(x, y))$ occurs subsequent to the dividing of each of the plurality of strips into multiple vertical segments. In some embodiments, the means for computing the optimal convergence for each of the multiple vertical segments of the seam region comprises means for computing an accumulated distance matrix by accumulating each of the distances in the distance matrix, wherein optimal convergence is identified by the accumulated distance matrix having a minimal cumulative error. In some embodiments, accumulating each of the distances in the distance matrix is performed via a dynamic programming process.

In some embodiments, the set of convergence values are varied across the seam region in a horizontal or a vertical direction, the apparatus further comprises means for computing a curve denoting a variation of convergence for the narrow seam for a specified number of points. In some embodiments, the apparatus may further comprise means for applying a smoothness parameter to guide the convergence amongst the plurality of computed convergence values. In some embodiments, the apparatus may further comprise, in an instance in which an object is captured within a predetermined distance of a camera, means for enabling convergence transitions between segments exceeding a predefined threshold.

In some embodiments, an apparatus may be provided comprising at least one processor and at least one memory including computer program code, the at least one memory and the computer program code configured to, with the processor, cause the apparatus to at least extract the seam region from the overlapping images, wherein the overlapping images comprise a first image captured by a first image capturing device and a second image captured by a second image capturing device, apply a set of convergence values to the seam region generating a plurality of strips corresponding to the seam region, divide each of the plurality of strips into multiple vertical segments, and compute an optimal convergence for the seam region using the multiple vertical segments.

In some embodiments, the overlapping images sharing the seam region, the seam region being a region of each of the first image and the second images depicting a common captured area. In some embodiments, the at least one memory and the computer program code are further configured to, with the processor, cause the apparatus to compute a distance matrix $(d(x, y))$ wherein x is a segment index value and y is an associated convergence value. In some embodiments, the computing of the distance matrix $(d(x, y))$ occurs subsequent to the dividing of each of the plurality of strips into multiple vertical segments. In some embodiments, computing the optimal convergence for each of the multiple vertical segments of the seam region comprises computing an accumulated distance matrix by accumulating each of the distances in the distance matrix, wherein optimal convergence is identified by the accumulated distance matrix having a minimal cumulative error. In some embodiments, accumulating each of the distances in the distance matrix is performed via a dynamic programming process.

In some embodiments, the set of convergence values are varied across the seam region in a horizontal or a vertical direction, wherein the at least one memory and the computer program code are further configured to, with the processor, cause the apparatus to compute a curve denoting a variation of convergence for the narrow seam for a specified number of points. In some embodiments, the at least one memory and the computer program code are further configured to, with the processor, cause the apparatus to apply a smoothness parameter to guide the convergence amongst the plurality of computed convergence values. In some embodiments, the at least one memory and the computer program code are further configured to, with the processor, cause the apparatus to, in an instance in which an object is captured within a predetermined distance of a camera, enable convergence transitions between segments exceeding a predefined threshold.

BRIEF DESCRIPTION OF THE DRAWINGS

Figure 1:
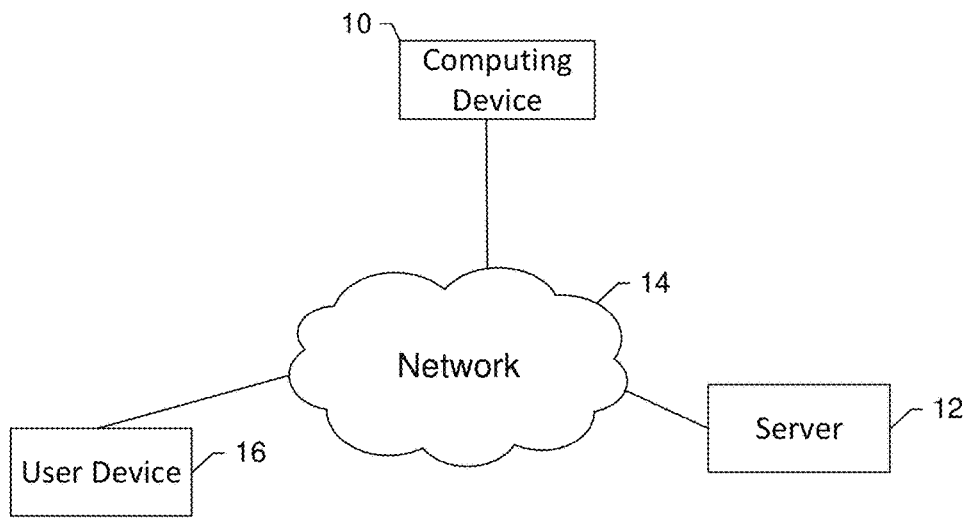
Figure 2:
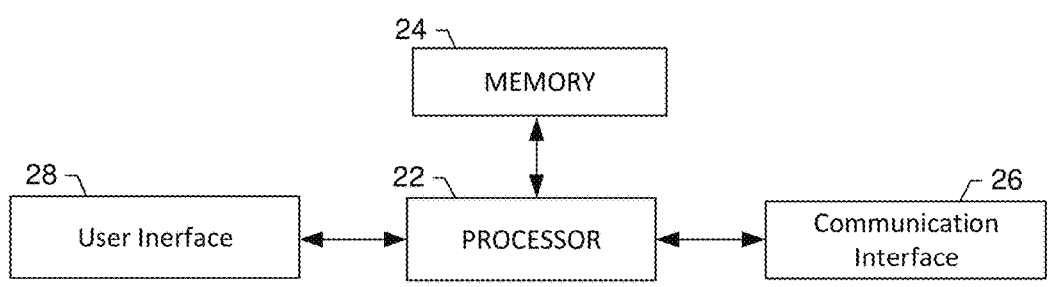
Figure 3:
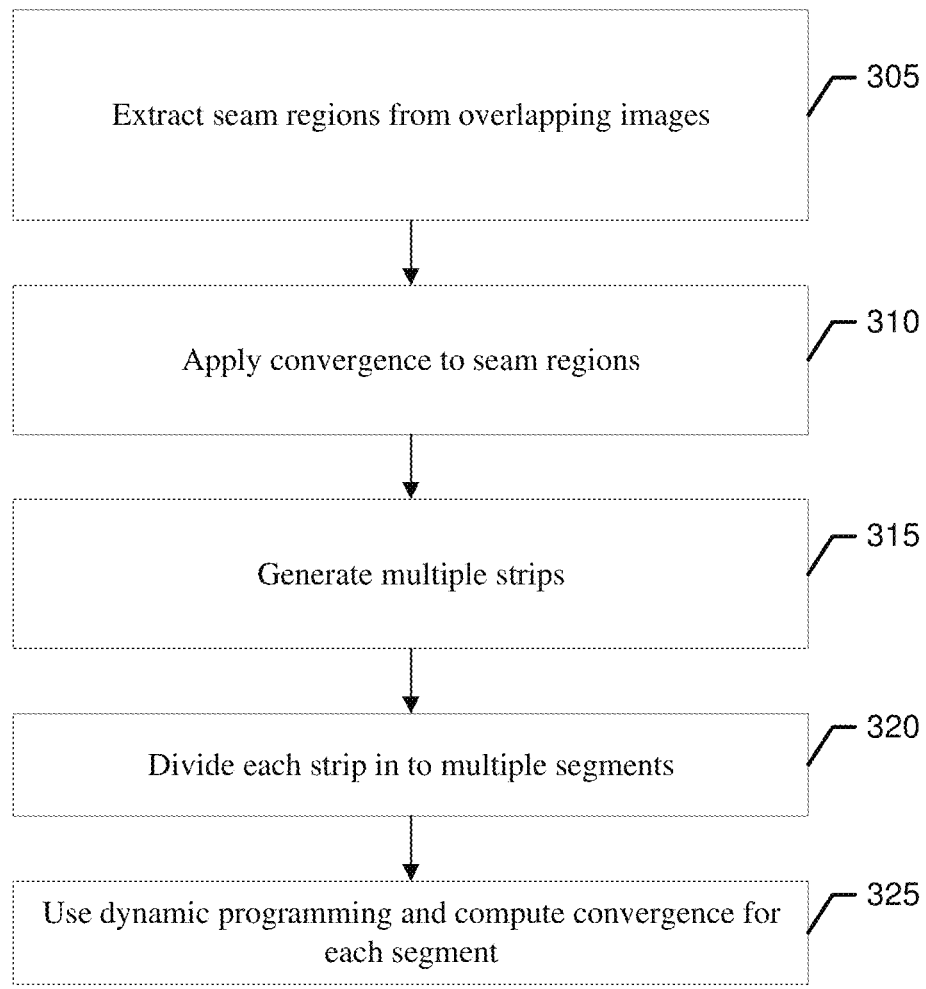
Figure 4A:
Figure 4B:

Having thus described embodiments of the invention in general terms, reference will now be made to the accompanying drawings, which are not necessarily drawn to scale, and wherein:

FIG. 1 is block diagram of a system that may be specifically configured in accordance with an example embodiment of the present invention;

FIG. 2 is a block diagram of an apparatus that may be specifically configured in accordance with an example embodiment of the present invention;

FIG. 3 is an example flowchart illustrating a method of operating an example apparatus in accordance with an embodiment of the present invention;

FIGS. 4A and 4B show images from two cameras which overlap in a narrow seam.

FIGS. 5A-5E show a data representation, in accordance with an embodiment of the present invention.

DETAILED DESCRIPTION

Some example embodiments will now be described more fully hereinafter with reference to the accompanying drawings, in which some, but not all embodiments are shown. Indeed, the example embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

As used herein, the term "circuitry" refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or application specific integrated circuit for a mobile phone or a similar integrated circuit in a server, a cellular network device, or other network device.

Referring now of FIG. 1, a system that supports communication, either wirelessly or via a wireline, between a computing device 10, a server 12 or other network entity (hereinafter generically referenced as a "server"), and a user device 16 is illustrated. As shown, the computing device 10, the server 12, and the user device 16 may be in communication via a network 14, such as a wide area network, such as a cellular network or the Internet or a local area network. However, the computing device and the server may be in communication in other manners, such as via direct communications between the computing device and the server.

The computing device 10 or the user device 16 may be embodied by a number of different devices including mobile computing devices, such as a personal digital assistant (PDA), mobile telephone, smartphone, laptop computer, tablet computer, or any combination of the aforementioned, and other types of voice and text communications systems. Alternatively, the computing device 10 and/or user device 16 may be a fixed computing device, such as a personal computer, a computer workstation or the like. The server 12 may also be embodied by a computing device and, in one embodiment, is embodied by a web server. Additionally, while the system of FIG. 1 depicts a single server, the server may be comprised of a plurality of servers which may collaborate to support browsing activity conducted by the computing device. The user device 16 may be embodied by a computing device 10, and in one embodiment, may be comprised of a plurality of computing devices.

The network 14 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. In this regard, the communications interface 308 may be capable of operating with one or more air interface standards, communication protocols, modulation types, access types, and/or the like. More particularly, the system 302, the communications interface 308 or the like may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Regardless of the type of device that embodies the computing device 10 or user device 16, the computing device 10 or user device 16 may include or be associated with an apparatus 20 as shown in FIG. 2. In this regard, the apparatus may include or otherwise be in communication with a processor 22, a memory device 24, a communication interface 26 and a user interface 28. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 22 (and/or co-processors or any other processing circuitry assisting or otherwise associated with the processor) may be in communication with the memory device 24 via a bus for passing information among components of the apparatus. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus 20 to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a computing device 10 configured to employ an example embodiment of the present invention. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a head mounted display) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor. In one embodiment, the processor may also include user interface circuitry configured to control at least some functions of one or more elements of the user interface 28.

Meanwhile, the communication interface 26 may be any means such as a device or circuitry embodied in either hardware or a combination of hardware and software that is configured to receive and/or transmit data between the computing device 10 and a server 12. In this regard, the communication interface 26 may include, for example, an antenna (or multiple antennas) and supporting hardware and/or software for enabling communications wirelessly. Additionally or alternatively, the communication interface may include the circuitry for interacting with the antenna(s) to cause transmission of signals via the antenna(s) or to handle receipt of signals received via the antenna(s). For example, the communications interface may be configured to communicate wirelessly with the head mounted displays 10, such as via Wi-Fi, Bluetooth or other wireless communications techniques. In some instances, the communication interface may alternatively or also support wired communication. As such, for example, the communication interface may include a communication modem and/or other hardware/software for supporting communication via cable, digital subscriber line (DSL), universal serial bus (USB) or other mechanisms. For example, the communication interface may be configured to communicate via wired communication with other components of the computing device.

The user interface 28 may be in communication with the processor 22, such as the user interface circuitry, to receive an indication of a user input and/or to provide an audible, visual, mechanical, or other output to a user. As such, the user interface may include, for example, a keyboard, a mouse, a joystick, a display, a touch screen display, a microphone, a speaker, and/or other input/output mechanisms. In some embodiments, a display may refer to display on a screen, on a wall, on glasses (e.g., near-eye-display), in the air, etc. The user interface may also be in communication with the memory 24 and/or the communication interface 26, such as via a bus.

In an example embodiment, components/modules of the apparatus 20 may be implemented using standard programming techniques. For example, the apparatus 20 may be implemented as a "native" executable running on the processor 22, along with one or more static or dynamic libraries. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

In addition, programming interfaces to the data stored as part of the apparatus 20, can be made available by standard mechanisms such as through C, C++, C#, and Java APIs; libraries for accessing files, databases, or other data repositories; through languages such as XML; or through Web servers, FTP servers, or other types of servers providing access to stored data. A data store may also be included and it may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the apparatus 20 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Some or all of the system components and data structures may also be stored as a web application, "app", or any HTML5 or JavaScript™ application, such as a computer software application that is coded in a browser-supported programming language (such as JavaScript™) combined with a browser-rendered markup language like HTML5, reliant on a common web browser to render the application executable. The opening of a web page or "app" may be performed by a web browser on computing device 10. An HTML5 or JavaScript™ "app" allows web page script to contact a server 12, such as those shown in FIG. 1, for storing and retrieving data without the need to re-download an entire web page. Some or all of the system components and data structures may also be stored as a privileged web application or privileged web app. A privileged web app is a piece of web content that may have been verified by, for example, means of an app store or stores or may have obtained or downloaded from a source that is trusted source. A trusted source may provide a privileged web app that may be enabled to override the default power settings. Such computer program products may also take other forms in other embodiments. Accordingly, embodiments of this disclosure may be practiced with other computer system configurations.

FIG. 3 illustrates an example flowchart of the example operations performed by a method, apparatus and computer program product in accordance with an embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 26 of an apparatus employing an embodiment of the present invention and executed by a processor 24 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIG. 3, when executed, convert a computer or processing circuitry into a particular machine configured to perform an example embodiment of the present invention. Accordingly, the operations of FIG. 3 define an algorithm for configuring a computer or processing to perform an example embodiment. In some cases, a general purpose computer may be provided with an instance of the processor which performs the algorithm of FIG. 3 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments additional optional operations may also be included. It should be appreciated that each of the modifications, optional additions or amplifications below may be included with the operations above either alone or in combination with any others among the features described herein.

In one example embodiment, a method, apparatus and/or computer program product may be provided for image adjustment in panoramic image stitching, and in particular, for example, to reduce artifacts in the seam region or region of overlap when stitching multiple images to form a panoramic image.

A seam region or region of overlap, as used herein, is an area, for example, of the 360-degree panorama, where two adjacent cameras' fields of view overlap.

Convergence is a function which scales the image co-ordinate by a given amount, termed as convergence value. The scaling may be done for all the pixel co-ordinates with regard to image center as the origin of the scaling.

For example, if c(x,y) is the convergence at point (x,y), then an output image $I_{Out}$ may be computed using c(x,y) and input image I_in(x,y) by using the following expressions.

$$xi=x-cx;\ yi=y-cy;$$

{cx, cy are the center points of fish eye image, x,y are normalized image coordinates)

$$dx=xi*c(x,y);\ dy=yi*c(x,y);$$

$$xo=dx+cx;\ yo=dy+cy;$$

$$I_{Out}(xo,yo)=I\text{in}(xi,yi);$$

Because the objects at different depths in the seam region are often not aligned in stitching, the convergence value may be varied across the seam region, for example, in the horizontal and/or the vertical directions, to align the objects.

Embodiments described herein provide an automatic method and a semi-automatic method to stitch the content.

For example, in one embodiment, a curve editor may be used to adjust the convergence of the narrow seam manually by adjusting the curve and by assigning points.

In some embodiments, an automatic method may be utilized which computes the curve denoting the variation of convergence of the narrow seam for a specified number of points.

The seam region may then be divided into multiple segments (e.g., vertical segments) and the convergence may then be optimally computed for these segments so that the overall distortion error computed in the seam region is minimal.

In some embodiments, a smoothness parameter may be defined. The smoothness parameter may then be utilized to guide the output convergence such that the computed convergence values are smoothly transitioning amongst themselves.

In some embodiments, a mode to address extreme foreground cases where the objects are very close to the camera may be provided. In this mode the curve's smoothness may be compromised and drastic changes in convergence is allowed to deal with extreme foreground and background combinations (e.g., a non-smooth mode of operation).

The outputs of the automatic method described above may be used as a starting point and/or to assist and the convergence points may be edited manually for improved results in those particular cases in which automatic method may need improvement.

FIG. 3 is an example flowchart illustrating a method of operating an example computing device, performed in accordance with an embodiment of the present invention. Specifically FIG. 3 shows an example method for minimizing artifacts in the stitching of multiple images to form a panoramic image.

Extracting Seam Regions from Overlapping Images

As shown in block 305 of FIG. 3, the apparatus 20 embodied by the computing device 10 may be configured to extract seam regions from overlapping images. The apparatus embodied by the computing device may therefore include means, such as the processor 22, the communication interface 26 or the like, for extracting seam regions from overlapping images.

Figure 5A:
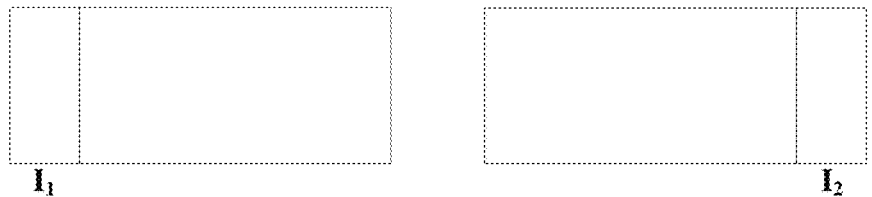

As shown in FIGS. 4A and 4B, images I1 and I2 are the images from cameras c1 and c2 which are overlapping at the narrow seam. In a general case, two image may be captured by two cameras, the two images having a common (e.g., overlapping) region. FIG. 5A shows a graphic representation of the first image and the second image, each image comprising an overlapping region or seam region, $I_1$ and $I_2$, respectively.

Generating Multiple Strips

Figure 5B:
Figure 5C:
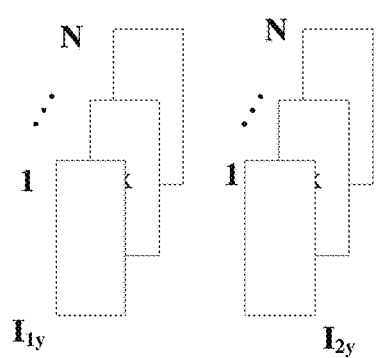

The seam regions $I_1$ and $I_2$ may be extracted, as shown in FIG. 5B, and a set of convergence values(N) may be applied to the image regions/strips. The resulting strips may be denoted by $I_{1y}$ and $I_{2y}$, for example, as shown in FIG. 5C. N strips may then be generated corresponding to each strip, $I_{1y}$ and $I_{2y}$.

As such, as shown in block 310 of FIG. 3, the apparatus 20 embodied by the computing device 10 may be configured to apply convergence to each of one or more seam regions. The apparatus embodied by the computing device may therefore include means, such as the processor 22, the communication interface 26 or the like, for applying convergence to each of one or more seam regions.

Subsequently, as shown in block 315 of FIG. 3, the apparatus 20 embodied by the computing device 10 may be configured to generate multiple strips, for example, corresponding to each of the seam regions. The apparatus embodied by the computing device may therefore include means, such as the processor 22, the communication interface 26 or the like, for generating multiple strips.

Computing a Distance Matrix

Figure 5D:
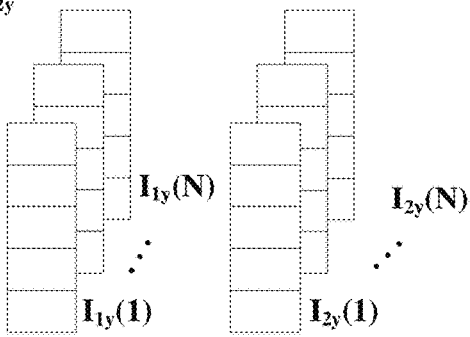
Figure 5E:
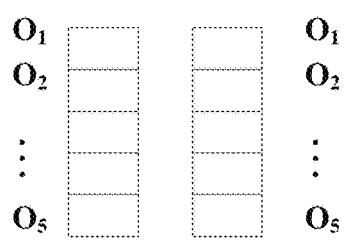

Each strip from the set of image strips $I_{1y}$ and $I_{2y}$ may be divided into multiple segments vertically, for example, as shown in FIG. 5D, into X segments and a distance matrix d(x,y) is computed.

$$d(x,y)=\Sigma|(I_{1y}(x)-I_{2y}(x))| \qquad (1)$$

x denotes the segment index coordinate and y denotes the convergence value. 0<x<X; 0<y<N. $I_{1y}$ is the seam region of image $I_1$ modified a convergence value of y, also known as a strip. $I_{1y}(x)$ is the segment 'x' of the strip $I_{1y}$. The summation is over the segment x.

Accordingly, as shown in block 320 of FIG. 3, the apparatus 20 embodied by the computing device 10 may be configured to divide each strip to multiple segments. The apparatus embodied by the computing device may therefore include means, such as the processor 22, the communication interface 26 or the like, for dividing each strip to multiple segments.

Computing the Optimal Convergence for the Seam Region

As shown in block 325 of FIG. 3, the apparatus 20 embodied by the computing device 10 may be configured to compute optimal convergence for each segment. The apparatus embodied by the computing device may therefore include means, such as the processor 22, the communication interface 26 or the like, for computing an optimal convergence for each segment.

In some embodiments, for example, dynamic time warping programming may be used to compute an accumulated distance matrix A(x,y) as follows.

First, the accumulated distance matrix may be computed by accumulating the distances in the distance matrix using a dynamic programming approach.

$$A(x,y)=d(x,y)+\min\{(A(x,y-1),A(x-1,y-1),A(x-1,y)\}; \qquad (2)$$

The optimal path (e.g., the final curve) in the accumulated distance matrix may be the one that has a minimal cumulative error and may be computed by backtracking the path from the minimum distance in the last column. The x and y coordinates of the optimal path convey the best convergence value per segment.

In some embodiments, a smoothness parameter may be used. When using a smoothness parameter, by specifying a smoothness parameter, the step increment $\Delta$ may be varied accordingly while accumulating the distances.

(a): $\Delta = K - S + 1;$ (3)

S is smoothness parameter; K may be a constant and may be set to 5.

In some embodiments, $0 < S < K$.

(b): In some embodiments, for example, S=5 may compute the result with maximum smoothness and may be computed by equation (2).

(c): For other smoothness factors, the resulting convergence may be computed by finding A(x,y) using equation (3) and then back tracing the path.

In an instance in which S is specified as 2, then A is 3 and the cumulated distance computation is modified to this below case.

$A(x,y)=d(x,y)+\min\{(A(x,y-\Delta),A(x-\Delta,y-\Delta),A(x-\Delta,y)\}++\min\{(A(x,y-\Delta+1),A(x-\Delta+1,y-\Delta+1),A(x-\Delta+1,y)\}+\ldots+\min\{(A(x,y-1),A(x-1,y-1),A(x-1,y)\};$ (4)

When using extreme foreground option, the value of K may be set to N in equation (3) and the steps in described above with regard to using the smoothness parameter may be performed to compute optimal convergence. The computed convergence allows for sharp convergence transitions between neighboring segments, for example, in those instances in which neighboring segments correspond to foreground and background combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method, comprising: extracting the seam region from the overlapping images, wherein the overlapping images comprise a first image captured by a first image capturing device and a second image captured by a second image capturing device, applying a set of convergence values to the seam region generating a plurality of strips corresponding to the seam region;
   dividing the plurality of strips into multiple vertical segments;
   for each of the multiple vertical segments, computing a distance matrix (dtx. v)f wherein x is a segment index value and v is an associated convergence value;
   and computing an optimal convergence for the seam region using the multiple vertical segments.

2. The method according to claim 1, wherein the overlapping images share the seam region, the seam region being a region of each of the first image and the second images depicting a common captured area.

3. The method according to claim 1, wherein the computing of the distance matrix (d(x, y)) occurs subsequent to the dividing of the plurality of strips into multiple vertical segments.

4. The method according to claim 1, wherein computing the optimal convergence for each of the multiple vertical segments of the seam region comprises: computing an accumulated distance matrix by accumulating each of the distances in the distance matrix, wherein optimal convergence is identified by the accumulated distance matrix having a minimal cumulative error.

5. The method according to claim 4, wherein accumulating each of the distances in the distance matrix is performed via a dynamic programming process.

6. The method according to claim 1, wherein the set of convergence values are varied across the seam region in a horizontal or a vertical direction, the method further comprises: computing a curve denoting a variation of convergence for the narrow seam for a specified number of points.

7. The method according to claim 1, further comprising: applying a smoothness parameter to guide the convergence amongst the plurality of computed convergence values.

8. The method according to claim 1, further comprising: in an instance in which an object is captured within a predetermined distance of a camera, enabling convergence transitions between segments exceeding a predefined threshold.

9. A computer program product comprising at least one non-transitory computer-readable storage medium having computer-executable program code instructions stored therein, the computer-executable program code instructions comprising program code instructions for: extracting the seam region from the overlapping images, wherein the overlapping images comprise a first image captured by a first image capturing device and a second image captured by a second image capturing device, applying a set of convergence values to the seam region generating a plurality of strips corresponding to the seam region;
   dividing the plurality of strips into multiple vertical segments;
   for each of the multiple vertical segments, computing a distance matrix (dtx. v)f wherein x is a segment index value and v is an associated convergence value;
   and computing an optimal convergence for the seam region using the multiple vertical segments.

10. The computer program product according to claim 9, wherein the overlapping images share the seam region, the seam region being a region of each of the first image and the second images depicting a common captured area.

11. An apparatus, comprising: at least one processor;
    at least one memory comprising computer program code, the at least one memory and the computer program code configured to, with the at least one processor, cause the apparatus to at least perform: extract the seam region from the overlapping images, wherein the overlapping images comprise a first image captured by a first image capturing device and a second image captured by a second image capturing device, apply a set of convergence values to the seam region generating a plurality of strips corresponding to the seam region;

divide the plurality of strips into multiple vertical segments;

for each of the multiple vertical segments, compute a distance matrix (dtx. v)f wherein x is a segment index value and v is an associated convergence value;

and compute an optimal convergence for the seam region using the multiple vertical segments.

12. The apparatus according to claim 11, wherein the overlapping images share the seam region, the seam region being a region of each of the first image and the second images depicting a common captured area.

13. The apparatus according to claim 11, wherein the apparatus is further caused to: compute a distance matrix (d(x, y)) wherein x is a segment index value and y is an associated convergence value.

14. The apparatus according to claim 11, wherein the apparatus is further caused to: compute an accumulated distance matrix by accumulating each of the distances in the distance matrix, wherein optimal convergence is identified by the accumulated distance matrix having a minimal cumulative error.

15. The apparatus according to claim 11, wherein accumulating each of the distances in the distance matrix is performed via a dynamic programming process.

16. The apparatus according to claim 11, wherein the set of convergence values are varied across the seam region in a horizontal or a vertical direction, the apparatus further caused to:

compute a curve denoting a variation of convergence for the narrow seam for a specified number of points.

17. The apparatus according to claim 11, wherein the apparatus is further caused to: apply a smoothness parameter to guide the convergence amongst the plurality of computed convergence values.

18. The apparatus according to claim 11, wherein the apparatus is further caused to:

in an instance in which an object is captured within a predetermined distance of a camera, enable convergence transitions between segments exceeding a predefined threshold.

* * * * *